United States Patent
Whittaker et al.

(10) Patent No.: US 7,793,229 B1
(45) Date of Patent: Sep. 7, 2010

(54) RECORDING RELEVANT INFORMATION IN A GUI WINDOW OF A PANEL DUMP BROWSER TOOL

(75) Inventors: Bruce Ernest Whittaker, Lake Forest, CA (US); Leland Elvis Watson, Temecula, CA (US)

(73) Assignee: Unisys Corporation, Blue Bell, PA (US)

( * ) Notice: Subject to any disclaimer, the term of this patent is extended or adjusted under 35 U.S.C. 154(b) by 898 days.

(21) Appl. No.: 10/742,116

(22) Filed: Dec. 19, 2003

(51) Int. Cl.
G06F 3/048 (2006.01)
G06F 3/00 (2006.01)

(52) U.S. Cl. .......................... 715/781; 714/46; 714/57; 715/806; 715/866

(58) Field of Classification Search ................. 714/57, 714/46; 715/781, 806, 866
See application file for complete search history.

(56) References Cited

U.S. PATENT DOCUMENTS

| | | | |
|---|---|---|---|
| 5,101,494 A * | 3/1992 | Bilski et al. ................. 717/127 |
| 5,111,384 A * | 5/1992 | Aslanian et al. ............... 714/26 |
| 5,724,516 A * | 3/1998 | Temoshenko ............... 709/202 |
| 5,790,777 A * | 8/1998 | Izuta et al. ..................... 714/45 |
| 5,819,024 A * | 10/1998 | Kasuga et al. ................. 714/26 |
| 5,819,028 A * | 10/1998 | Manghirmalani et al. ..... 714/57 |
| 5,847,972 A * | 12/1998 | Eick et al. ................... 709/246 |
| 5,941,996 A * | 8/1999 | Smith et al. ................... 714/47 |
| 5,999,933 A * | 12/1999 | Mehta ............................... 1/1 |
| 6,158,025 A * | 12/2000 | Brisse et al. ................... 714/48 |
| 6,170,067 B1 * | 1/2001 | Liu et al. ....................... 714/48 |
| 6,173,422 B1 * | 1/2001 | Kimura et al. ................ 714/57 |
| 6,243,838 B1 * | 6/2001 | Liu et al. ....................... 714/57 |
| 6,249,755 B1 * | 6/2001 | Yemini et al. ................ 702/183 |
| 6,314,034 B1 * | 11/2001 | Sugamori ..................... 365/201 |
| 6,353,899 B1 * | 3/2002 | Martin et al. ................. 714/57 |
| 6,430,706 B1 * | 8/2002 | Santerre et al. ............... 714/36 |
| 6,446,243 B1 * | 9/2002 | Huang et al. ................... 716/7 |
| 6,631,409 B1 * | 10/2003 | Watson et al. ............... 709/224 |
| 6,643,802 B1 * | 11/2003 | Frost et al. ..................... 714/37 |
| 6,654,915 B1 * | 11/2003 | Lu et al. ........................ 714/57 |
| 6,658,586 B1 * | 12/2003 | Levi ............................... 714/4 |
| 6,681,348 B1 * | 1/2004 | Vachon ......................... 714/45 |
| 6,708,293 B2 * | 3/2004 | Kaler et al. .................... 714/39 |
| 6,718,384 B2 * | 4/2004 | Linzy .......................... 709/224 |
| 6,718,489 B1 * | 4/2004 | Lee et al. ....................... 714/43 |
| 6,728,907 B1 * | 4/2004 | Wang et al. ................... 714/47 |
| 6,789,216 B2 * | 9/2004 | Zagorski et al. .............. 714/38 |
| 6,792,559 B1 * | 9/2004 | Cohen et al. .................. 714/15 |
| 6,915,461 B1 * | 7/2005 | Watanabe ..................... 714/57 |
| 6,965,978 B2 * | 11/2005 | Cohen et al. ................ 711/170 |

(Continued)

OTHER PUBLICATIONS

Unisys et al. "Cellular Multiprocessing Shared Memory, Shared Memory and Windows White Paper" Sep. 2000.*

*Primary Examiner*—Steven B Theriault
(74) *Attorney, Agent, or Firm*—James E. Goepel; Phuong-Quan Hoang

(57) ABSTRACT

An embodiment of the present invention is a technique for recording relevant information in a graphical user interface (GUI) window. Relevant information on an analysis window is saved in a summary report array using one of an automatic recording mode and a selective recording mode. The analysis window is part of the GUI to analyze state information from a panel dump file retrieved from a computer system. The saved relevant information is displayed on a report window.

8 Claims, 8 Drawing Sheets

U.S. PATENT DOCUMENTS

| | | | | |
|---|---|---|---|---|
| 7,028,056 B1* | 4/2006 | Hendel et al. | | 1/1 |
| 7,062,677 B1* | 6/2006 | Chigurupati | | 714/25 |
| 7,107,428 B2* | 9/2006 | Cohen et al. | | 711/170 |
| 7,127,642 B2* | 10/2006 | Wang et al. | | 714/45 |
| 7,188,338 B2* | 3/2007 | Ito | | 717/135 |
| 7,191,364 B2* | 3/2007 | Hudson et al. | | 714/38 |
| 7,290,175 B1* | 10/2007 | Kessler et al. | | 714/37 |
| 7,318,174 B2* | 1/2008 | Lewis | | 714/37 |
| 2002/0087949 A1* | 7/2002 | Golender et al. | | 717/124 |
| 2002/0198983 A1* | 12/2002 | Ullmann et al. | | 709/224 |
| 2003/0028857 A1* | 2/2003 | Zagorski et al. | | 717/124 |
| 2003/0079162 A1* | 4/2003 | Sutton | | 714/46 |
| 2003/0088425 A1* | 5/2003 | Lam et al. | | 705/1 |
| 2003/0154191 A1* | 8/2003 | Fish et al. | | 707/2 |
| 2004/0073854 A1* | 4/2004 | Windl | | 714/57 |
| 2005/0060689 A1* | 3/2005 | Bates et al. | | 717/125 |
| 2005/0102572 A1* | 5/2005 | Oberlaender | | 714/29 |
| 2005/0120273 A1* | 6/2005 | Hudson et al. | | 714/38 |
| 2005/0177656 A1* | 8/2005 | Hwang et al. | | 710/22 |

* cited by examiner

RECORDING RELEVANT INFORMATION IN A GUI WINDOW OF A PANEL DUMP BROWSER TOOL

CROSS-REFERENCE TO RELATED APPLICATIONS

This application is related to the following patent applications: Ser. No. 10/741,455, entitled "Panel Grouping For System State Analysis"; Ser. No. 10/741,391, entitled "Displaying Abnormal And Error Conditions In System State Analysis", issued as U.S. Pat. No. 7,171,593 on Jan. 30, 2007; Ser. No. 10/741,398, entitled "Diagnostic Tools For System Analysis Using Panel Dump File"; Ser. No. 10/741,397, entitled "Automatic Analysis Of Memory Operations Using Panel Dump File"; Ser. No. 10/742,158, entitled "Automatic Analysis Of Memory-Mapped I/O Operations Using Panel Dump File"; Ser. No. 10/742,115, entitled "Backward Location Finder Search In Panel Dump File"; Ser. No. 10/742,117, entitled "Reconstructing Bus Activities Using A Panel Dump File"; all filed on the same date and assigned to the same assignee as the present application, the contents of each which are herein incorporated by reference.

BACKGROUND

1. Field of the Invention

Embodiments of the invention are in the field of system analysis, and more specifically, relate to system state analysis tools.

2. Description of Related Art

System crashes as a result of faulty software are usually detected by the operating system. The operating system typically saves the state of system memory in a memory dump file. A debugger tool is used off-line to analyze such memory dump files. In the cases where the crashes are caused by hardware failures, memory dump file containing information regarding the state of the system memory cannot be used for the analysis since it is the state of the system component elements, not the state of the system memory, that is required. This state of the system is usually represented by the contents of the registers and/or storage elements relevant to the operation of the system. For large systems, the core of the hardware architecture may include a large number of processors, application specific integrated circuits (ASICs), etc. In large systems, the system state may be accessed through various means by a system maintenance processor. The system maintenance processor organizes the state into panels as the hardware state is taken. This state is then saved into a large text file called a panel dump file. A panel is a grouping of state bits that logically work together.

Examining the contents of the panel dump file to obtain meaningful interpretation of the system state is a challenge. Existing techniques for analysis of the system state has a number of drawbacks. An expert typically uses some text editing tool and search manually through the panel dump file for pertinent and helpful data. The procedure requires a high level of expertise and is very time-consuming and error-prone.

SUMMARY OF THE INVENTION

An embodiment of the present invention is a technique for recording relevant information in a graphical user interface (GUI) window. Relevant information on an analysis window is saved in a summary report array using one of an automatic recording mode and a selective recording mode. The analysis window is part of the GUI to analyze state information from a panel dump file retrieved from a computer system. The saved relevant information is displayed on a report window.

BRIEF DESCRIPTION OF THE DRAWINGS

The invention may be best understood by referring to the following description and accompanying drawings that are used to illustrate embodiments of the invention. In the drawings.

DESCRIPTION

An embodiment of the present invention is a technique for recording relevant information in a graphical user interface (GUI) window. Relevant information on an analysis window is saved in a summary report array using one of an automatic recording mode and a selective recording mode. The analysis window is part of the GUI to analyze state information from a panel dump file retrieved from a computer system. The saved relevant information is displayed on a report window.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the present invention is a panel dump browser tool to analyze system state and/or behavior of a computer system from a panel dump file. The system state is typically represented or defined by a set of relevant registers internal to a number of devices, processors, or ASICs. The panel dump browser tool has a graphical user interface (GUI) that presents the state information of the computer system in a well-structured and well-organized manner.

The recording technique used in the GUI of the panel dump browser tool provides a number of benefits to the user. First, it automatically saves relevant information in an analysis window to save time and effort for the user. Second, it provides selective saving option for the user for specific relevant information in an analysis window. Third, it allows the user to view and copy the saved information.

Figure 1A:
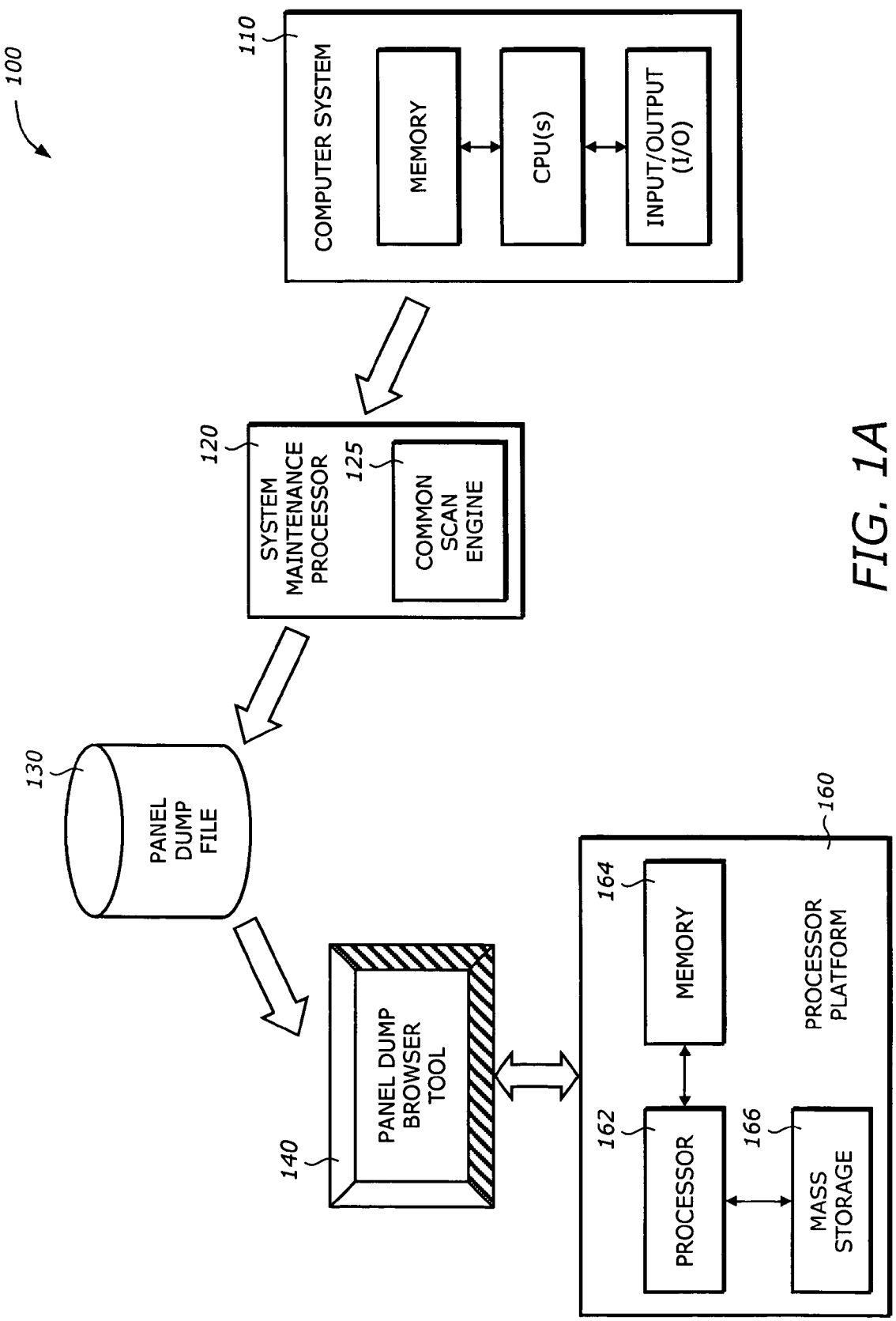
FIG. 1A is a diagram illustrating a system in which one embodiment of the invention can be practiced
Figure 1B:
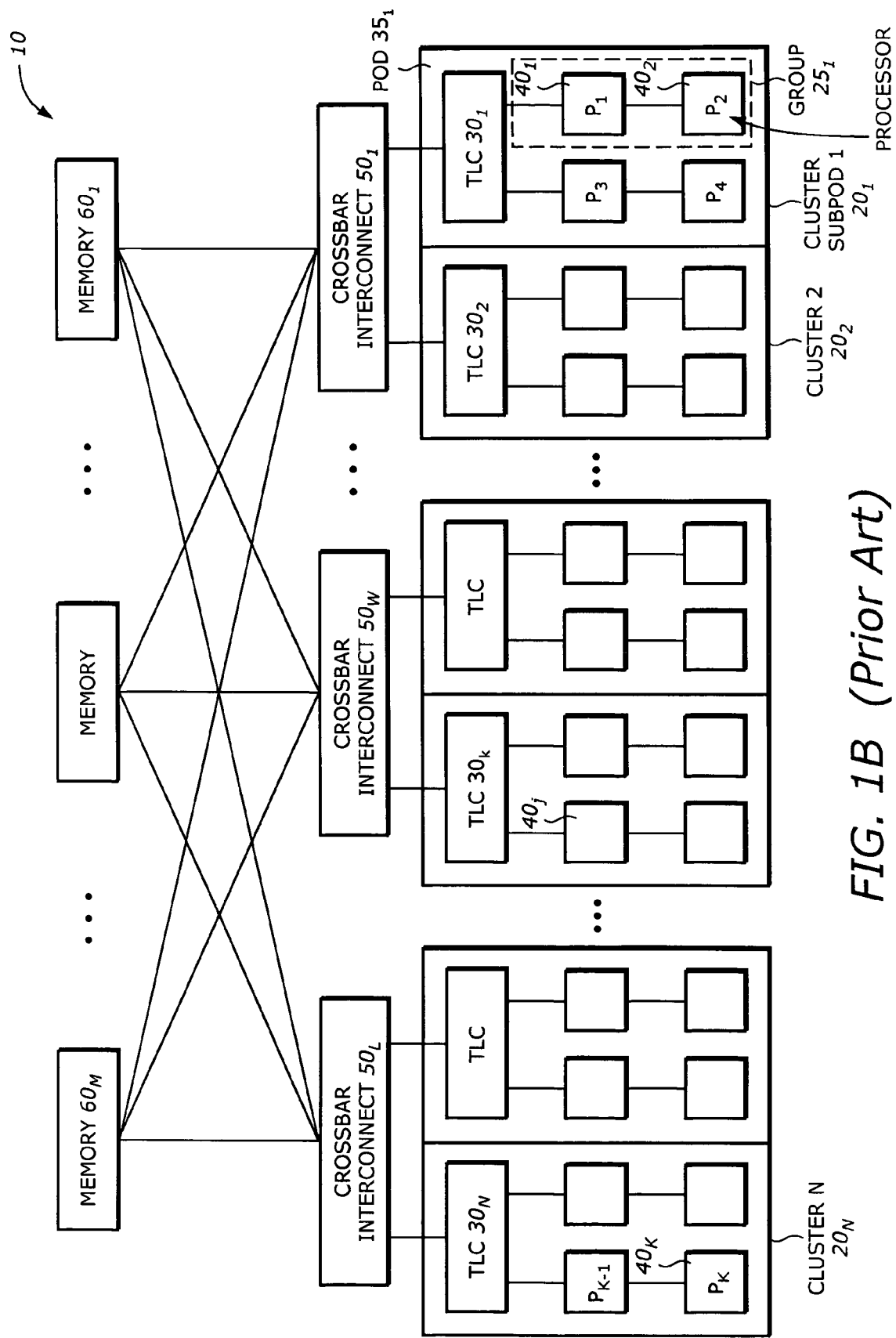
FIG. 1B is a diagram illustrating an embodiment of the computer system 110 of FIG. 1A.

The system state analysis tool may interface with a multiprocessor system as described in FIG. 1B, a single processor system, or any other systems. Special drivers, routines, or functions are provided to read the contents of the registers. A system state is presented as a snap-shot of these registers. The GUI allows the user to use any convenient wired or wireless input devices to navigate such as mouse, keyboard, trackball, etc. An action is performed when input device is activated or clicked when it is positioned at an appropriate location on the display screen.

FIG. 1A is a diagram illustrating a system 100 in which one embodiment of the invention can be practiced. The system 100 includes a computer system 110, a system maintenance processor 120, a panel dump file 130, a panel dump browser tool 140, and a processor platform 160.

The computer system 110 may be any computer system. It may be a multiprocessor system, a cellular multiprocessor system, a single processor system, a network of computers, an array of processors, etc. Typically; the computer system 110 is functionally organized as having a hierarchical structure of several levels. At the highest level, the computer system 110 may have several functional units of different types. For each type of functional unit, there may be several identical functional units. For example, the computer system 110 may be a cellular multiprocessor system which comprises clusters of processors. Each cluster of processors forms a subpod. There may also be several memory storage units (MSU's) which are connected to the subpods. Each subpod may contain several processors, each having similar or different functions. Each processor may include several elements such as data queue, arithmetic logical unit, memory read register, memory write register, etc. Since the architecture of the computer system 110 may be quite complex, it is useful to show the relationships of these functional units or subunits in a logical manner.

The system maintenance processor 120 is a processor that is dedicated to monitor the computer system 110 and to extract state information from the computer system 110 during a crash or at any other selected point in time. The system maintenance processor 120 may have access to several test points in the computer system 110. These test points may be provided at various status registers or serial shift registers for testing purposes. The system maintenance processor 120 includes a common scan engine 125. The common scan engine 125 scans all or most components of the computer system 110 to read their status or content, or state information. When there is a hardware failure that causes system crash, or upon an operator's command instructions, the system maintenance processor 120 retrieves the state information and writes all the information in the panel dump file 130 on a mass storage device for off-line analysis.

The panel dump file 130 is a file that contains all the necessary state information for analysis. The panel dump file 130 in essence is a text file arranged according to how the system maintenance processor 120 retrieves the information. For a large computer system such as a cellular multiprocessor system, the panel dump file 130 may contain several thousands lines of text.

The panel dump browser tool 140 is a system analysis tool that reads the panel dump file 130 and organizes the state information in a useful form. The panel dump browser tool 140 has a GUI that allows the user to examine the state information by navigating through several display panels or screens.

The processor platform 160 is a computer system that interfaces with the panel dump browser tool. It includes a processor 162, a memory 164, and a mass storage device 166.

The processor 162 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 164 stores system code and data. The memory 164 is typically implemented with dynamic random access memory (DRAM) or static random access memory (SRAM). The system memory may include program code or code segments implementing one embodiment of the invention. The memory 164 includes a panel dump browser tool 140 when loaded from mass storage. The panel dump browser tool 140 may also simulate the system panel browsing functions. The panel dump browser tool 140 contains instructions that, when executed by the processor 162, cause the processor to perform the tasks or operations as described in the following.

The mass storage device 166 stores archive information such as code, programs, files, data, databases, applications, and operating systems. The mass storage device 166 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 166 provides a mechanism to read machine-accessible media. The machine-accessible media may contain computer readable program code to perform tasks as described in the following.

FIG. 1B is a diagram illustrating an embodiment 10 of the system 110 of FIG. 1A. The system 10 includes N clusters of processors $20_1$ to $20_N$, L crossbar interconnects $50_1$ to $50_L$ and M memories $60_1$ to $60_M$. The system 10 is referred to as a cellular multiprocessor system.

Each of the clusters of processors $20_1$ to $20_N$ forms a subpod and includes a number of processor subsystems $40j$'s and a third level cache (TLC) $30_k$'s. The processor subsystems $40_j$'s within each cluster $20i$ further form into groups connected together via a bus structure. Each group is connected to the TLC $30_k$. It is contemplated that the number of processor subsystems $40_j$'s in a group and the number of groups in a cluster may be any suitable number according to the configuration. As illustrated in FIG. 1A, the processor subsystems $40_j$'s form two groups and each group consists of two processor subsystems. Each of the TLC $30_k$'s provides another level of cache memory in addition to the second level (L2) and first level (L1) caches in each of the processor subsystems $40j$'s. Each of the TLC $30_k$'s provides a larger cache memory than the L2 and L2 cache to improve performance by allowing the processors within a subpod or group to share cached information. The TLC $30k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40j$'s via the crossbar interconnects $50_m$'s. The memories may be implemented by any suitable memory technologies including SRAM and DRAM.

Figure 2:
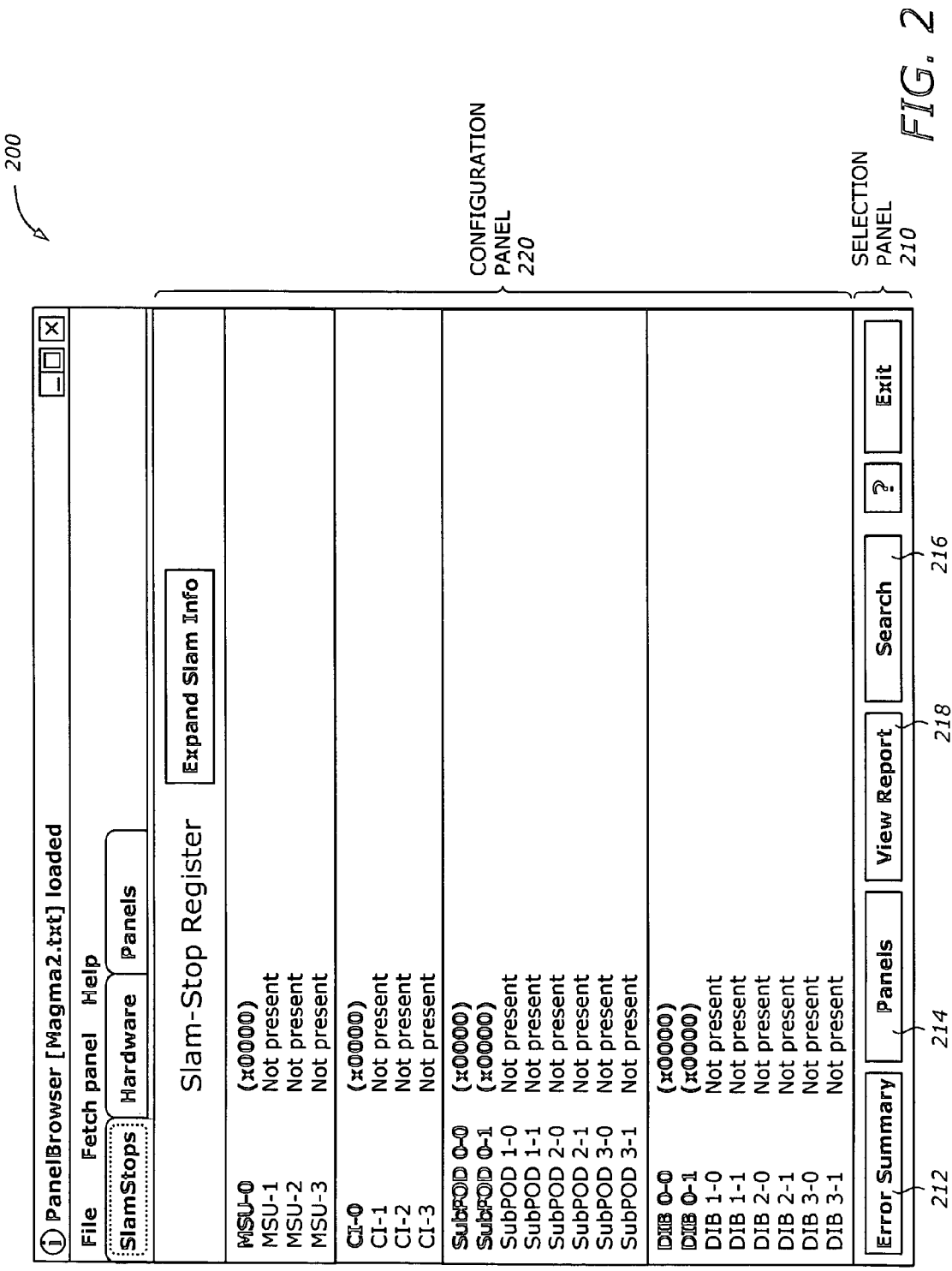
FIG. 2 is a diagram illustrating an initial window in the GUI according to one embodiment of the invention.

FIG. 2 is a diagram illustrating an initial window 200 in the GUI according to one embodiment of the invention. The initial window 200 is the first window to be displayed when the browser tool is started or when the analysis function of the browser tool is started. The initial window 200 includes a selection panel 210 and a configuration panel 220.

The selection panel 210 allows the user to select either pursuing a self-guided analysis by using the various panels of the tool or pursuing an automatic sequence of analysis. It includes an error summary button 212, a panels button 214, and a search button 216. The error summary button 212 corresponds to the automatic sequence. The automatic sequence performs much analysis for the user. The user needs only to integrate or combine the information obtained from these windows to arrive at the logical conclusion regarding the possible causes of the system failure. The panels button 214 corresponds to the self-guided analysis. It allows the user to select various panels of the functional units, subunits, and component of the system. The view report button 218 allows the user to view saved relevant information on a report window. The report window displays the relevant information saved in a report summary array.

The configuration panel 220 shows the configuration information on the system. It shows the maximum configuration but grays out any components that are not actually used or configured for the particular system being analyzed. In one embodiment, the configuration panel 220 includes the I/O units, the sub-pod units, the CI units, and the memory storage units (MSU's).

Figure 3:
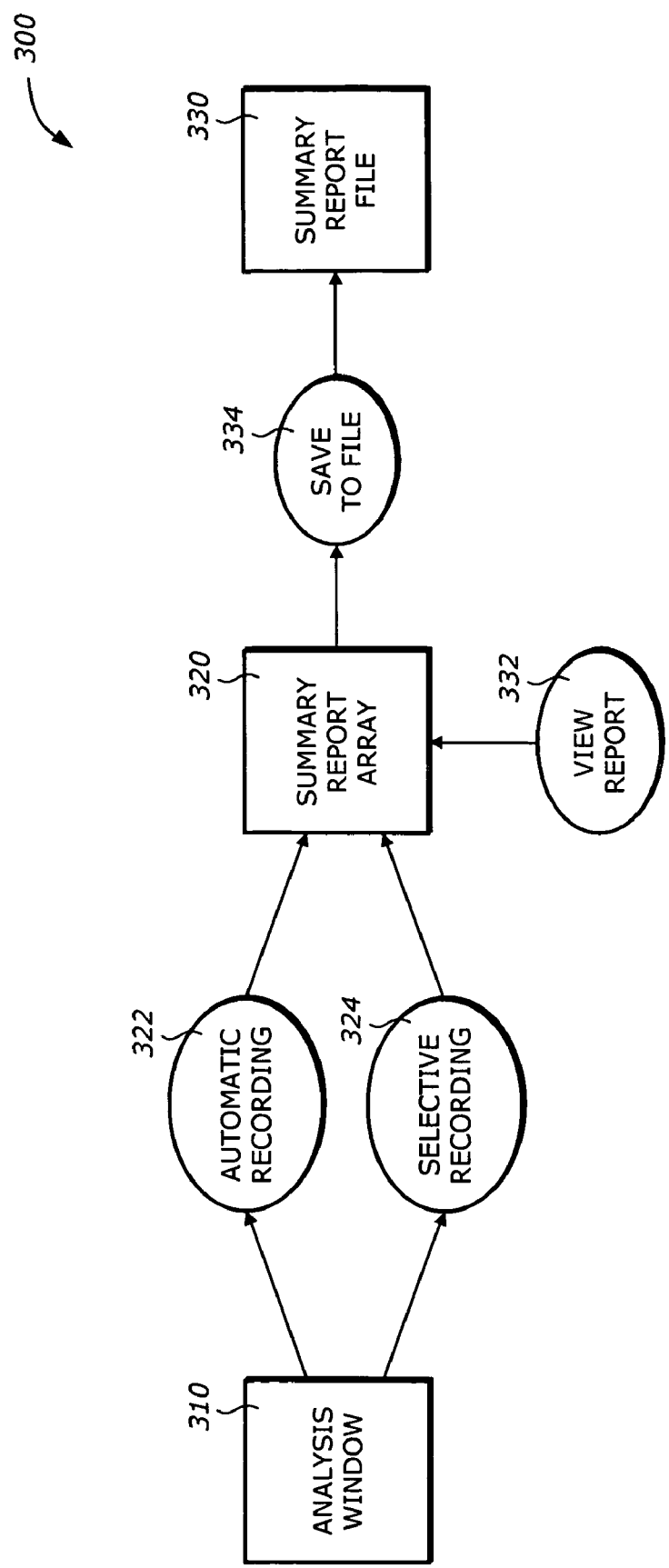
FIG. 3 is a diagram illustrating report recording according to one embodiment of the invention.

FIG. 3 is a diagram illustrating report recording 300 according to one embodiment of the invention. The report recording 300 includes an analysis window 310, an automatic recording mode 322, a selective recording mode 324, a summary report array 320, a view report option 332, a save to file option 334, and a summary report file 330.

The analysis window 310 is a window displayed as part of the analysis sequence provided by the panel dump browser tool. It may be part of the automatic sequence or the self-guided analysis. Typically, the analysis window 310 displays state information of a functional unit, a subunit, or an element of a subunit, etc. The state information may include contents of a register, a storage element, a contextual information, a description, a status condition, an error condition, or any other information that is related to the state of the system or its components.

The state information of the analysis window 310 is saved in the summary report array 320 using one of the recording mode: the automatic recording mode 322 and the selective recording mode 324. In the automatic recording mode 322, the relevant information of the analysis window 310 is saved automatically without the user's intervention or command. The saving is performed when the user views the analysis window 310. In this mode, the user may navigate back and forth and may go though the same analysis window 310 several times. To avoid recording the same window, the recording is performed only if the relevant information has not been recorded before. In the selective recording mode 324, the relevant information of the analysis window 310 is saved only when the user selects the recording option. The recording option is typically provided as a button on the analysis window 310. The saving is performed as soon as the user selects this recording option.

The summary report array 320 stores the relevant information in the analysis window 310 saved in either the automatic recording mode 322 or the selective recording mode 324. It can be viewed at any time by clicking the view report button 218 on the initial window (FIG. 2) using the view report mode 332. In the view report mode 332, the summary report array 320 is displayed in a report window.

The save-to-file option 334 saves the summary report array 320 in the summary report file 330. This option is typically available as a button on a GUI window. The summary report file 330 can be used by the user to generate an analysis report. It can be copied, edited, manipulated, combined with other files, etc. as necessary.

Figure 4:
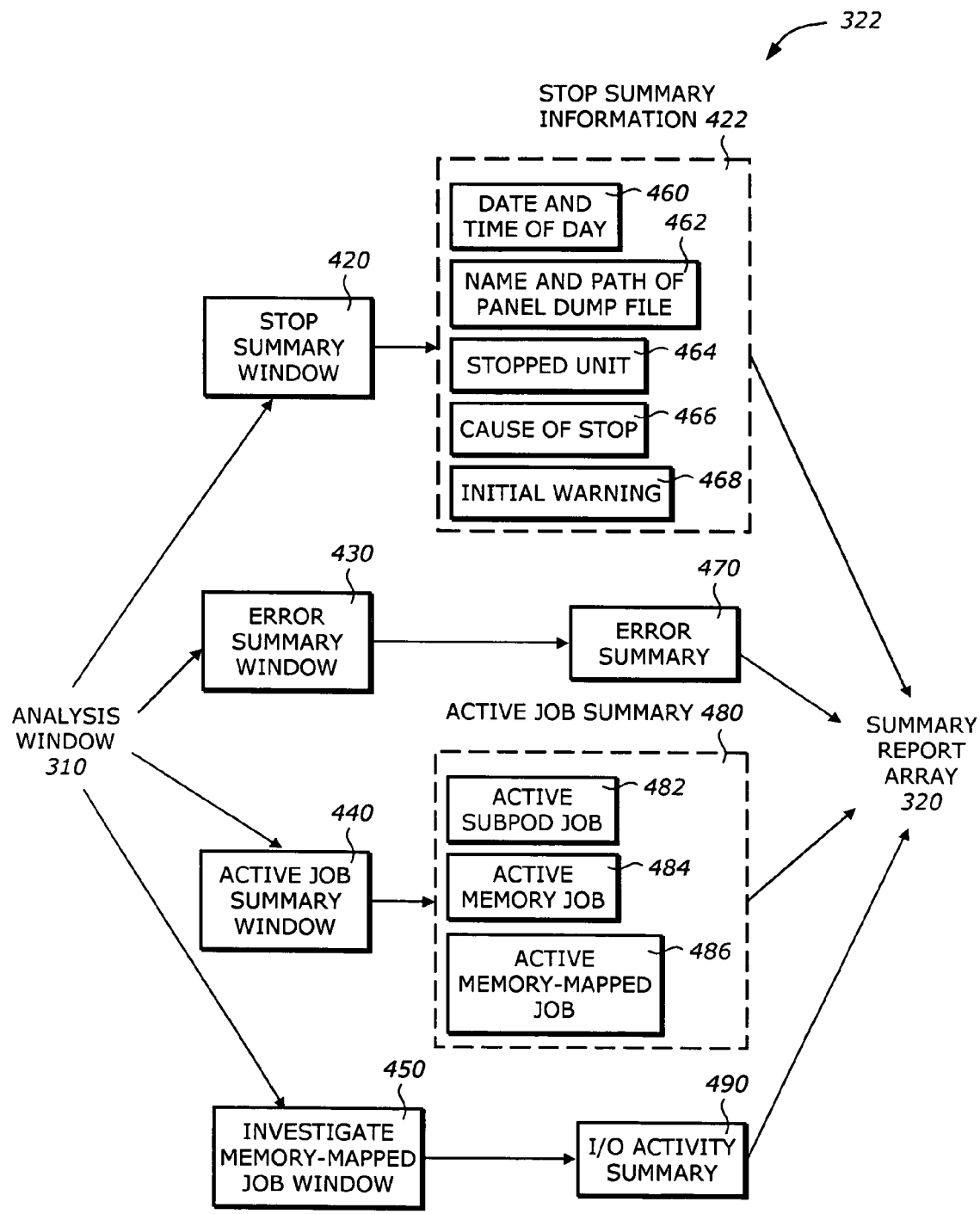
FIG. 4 is a diagram illustrating an automatic recording mode according to one embodiment of the invention.

FIG. 4 is a diagram illustrating the automatic recording mode 322 according to one embodiment of the invention. In this mode 322, certain relevant information of some types of the analysis window 310 is saved in the summary report array 310. The analysis window 310 for this mode includes a stop summary window 420, an error summary window 430, an active job summary window 440, and an investigate memory-mapped job window 450.

The stop summary window 420 contains state information of the system with initial warning information or status of functional units including those units that are stopped due to some fault or failure. The relevant information to be saved includes stop summary information 422. The stop summary information 422 includes at least one of date and time of day 460, name and path of the panel dump file 462, stopped unit(s) 464, cause(s) of stop 466, and initial warning 468 is any.

The error summary window 430 contains a summary of error conditions of the system. The relevant information is error summary 470. The error summary 470 may correspond to any unit that has an error condition.

The active job summary window 440 displays a list of active jobs in the functional units or subunits. The relevant information of the window 440 is an active job summary 480. The active job summary includes at least one of active subpod job 482, active memory job 484, and active memory-mapped job 486.

The investigate memory-mapped job window 450 displays a list of active memory-mapped jobs in the functional units. Memory-mapped jobs are input/output (I/O) jobs and may be issued by a processor or an I/O unit. The relevant information to be saved is an I/O activity summary 490.

Figure 5:
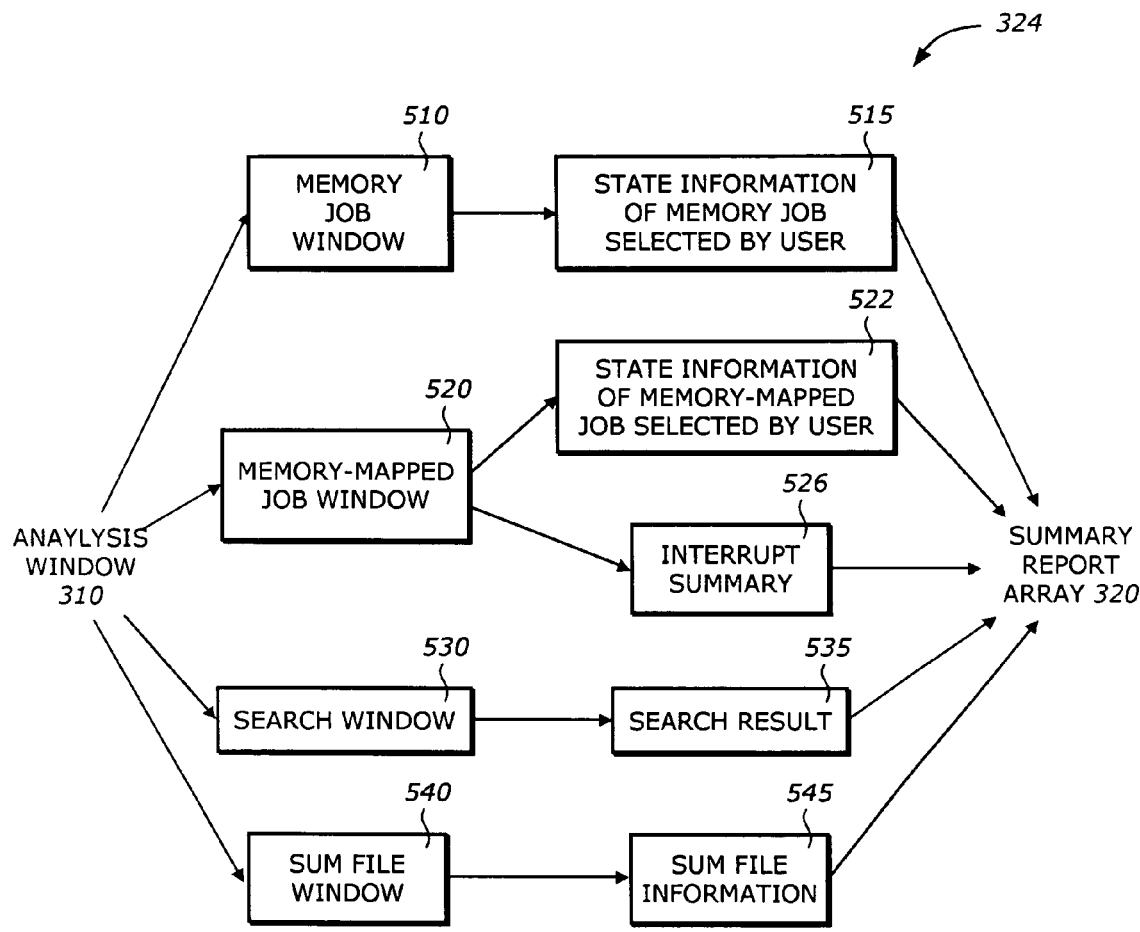
FIG. 5 is a diagram illustrating a selective recording mode according to one embodiment of the invention.

FIG. 5 is a diagram illustrating the selective recording mode 324 according to one embodiment of the invention. In this selective recording mode 324, certain relevant information of some types of the analysis window 310 is saved in the summary report array 310. The analysis window 310 for this mode includes a summary job window 510, a memory-mapped job window 520, a search window 530, and a sum file window 540.

The memory job window 510 contains a list of active memory jobs in the functional unit and the state information of a job selected by the user. The relevant information to be saved in the summary report array 320 (FIG. 3) is state information 515 of a memory job selected by the user.

The memory-mapped job window 520 contains a list of active memory-mapped (or I/O) jobs in the functional unit and the state information of a job selected by the user. The relevant information to be saved in the summary report array 320 is state information 522 of a memory-mapped job selected by the user, and an interrupt summary 526.

The search window 530 contains the result of a search for a search argument in the panel dump file. The relevant information to be saved in the summary report array 320 is the search result 535. The search result may contain none, or one, or multiple occurrences of the search argument in the panel dump file. Information on the location of this matched search argument is also saved. This includes the subunit or unit that contains the search argument.

The sum file window 540 contains sum file information 545. The relevant information to be saved in the summary report array 320 is the sum file information 545. This may include subpod activity and bus actions.

Figure 6:
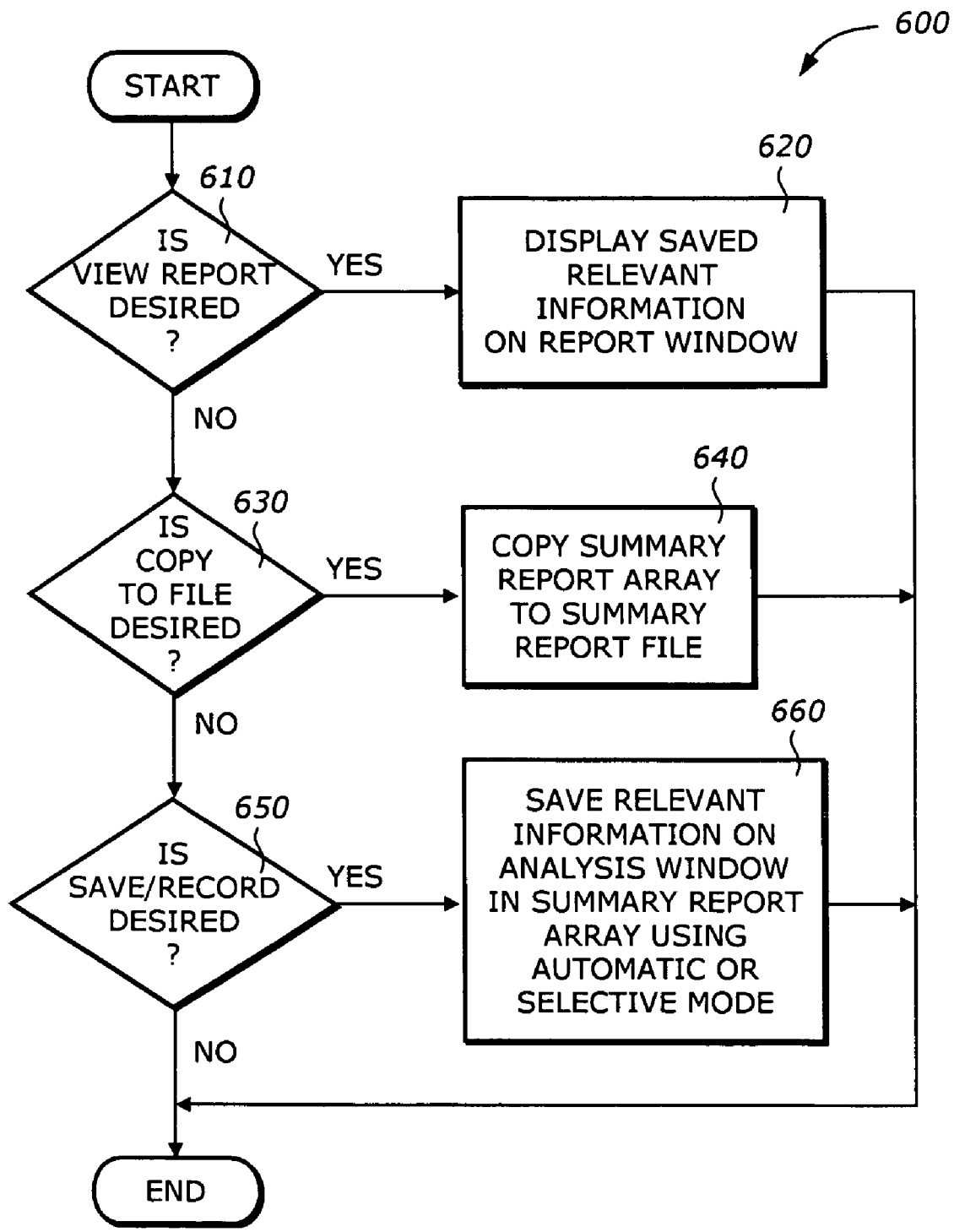
FIG. 6 is a flowchart illustrating a process to recording viewing information according to one embodiment of the invention.

FIG. 6 is a flowchart illustrating a process 600 for recording viewing information according to one embodiment of the invention.

Upon START, the process 600 determines if the view report is desired (Block 610). The report view is available as an option in the initial window. If so, the process 600 displays the saved relevant information in the summary report array on a report window (Block 620) and is then terminated. Otherwise, the process 600 determines if the copy to file option is desired (Block 630). If so, the process 600 copies the summary report array to the summary report file (Block 640) and is then terminated. Otherwise, the process 600 determines if the save/record option is desired (Block 650). If so, the process 600 saves relevant information on an analysis window in the summary report array using one of an automatic recording mode and the selective recording mode (Block 660) and is then terminated. Otherwise, the process 600 is terminated.

Figure 7:
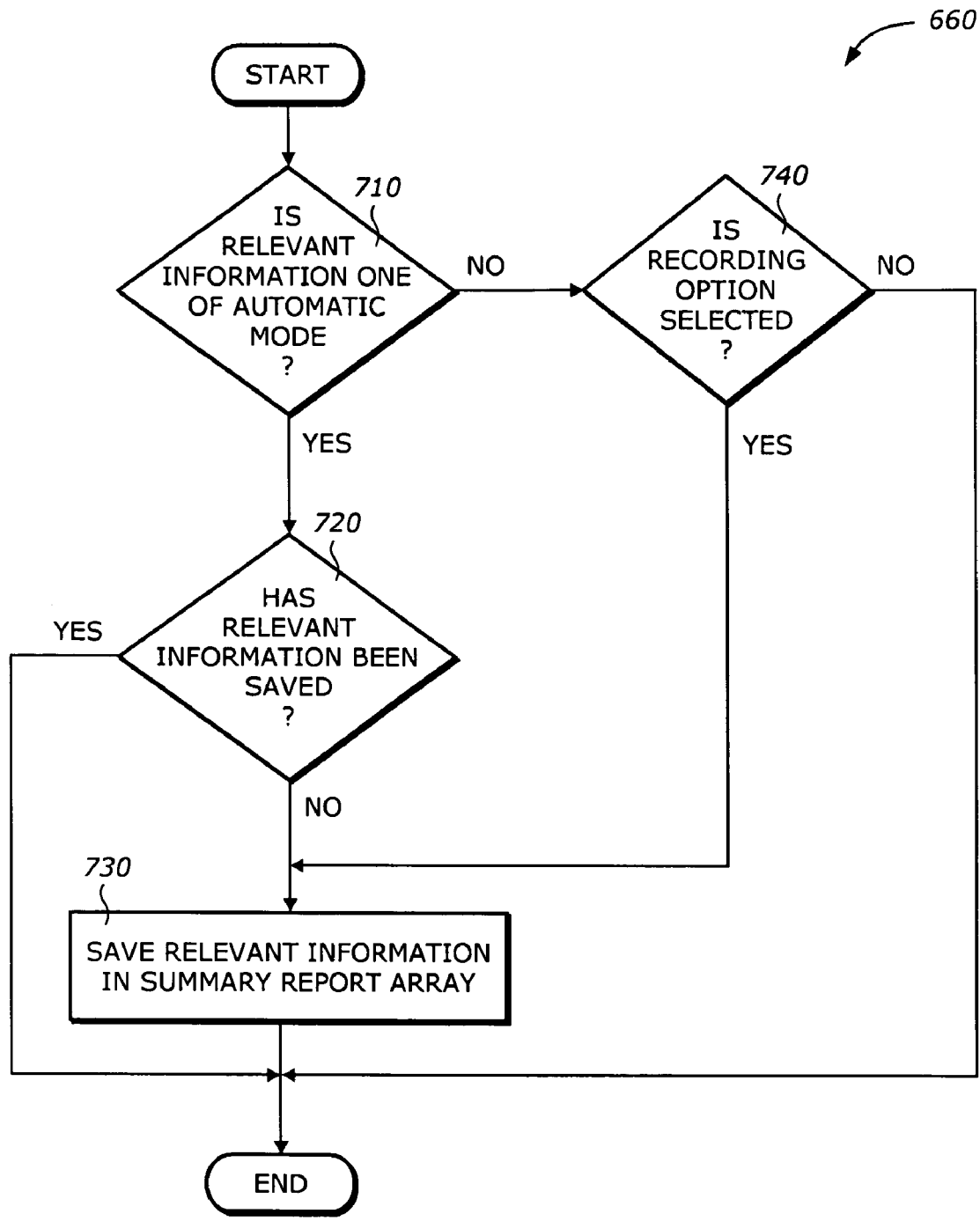
FIG. 7 is a flowchart illustrating a process to save relevant information in an analysis window according to one embodiment of the invention.

FIG. 7 is a flowchart illustrating a process 660 to save relevant information in an analysis window according to one embodiment of the invention.

Upon START, the process 660 determines if the relevant information is one of the automatic recording mode (Block 710). If not, the relevant information is in the selective recording mode and the process 660 determines if the recording option is selected (Block 740). If the recoding option is not selected, the process 660 is terminated. If the recording option is selected, the process 660 saves the relevant information in the summary report array (Block 730) and is then terminated.

If it is determined in Block 710 that the relevant information is in the automatic mode, the process 660 determines if the relevant information has been saved before (Block 720). If so, the process 660 is terminated because it is not desired to duplicate the recording. Otherwise, the process 660 (automatically) saves the relevant information in the summary report array 730 and is then terminated.

Elements of one embodiment of the invention may be implemented by hardware, firmware, software or any combination thereof. The term hardware generally refers to an element having a physical structure such as electronic, electro-magnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
 opening a panel dump file, the panel dump file comprising system state information stored by a system maintenance processor in a multiprocessor system;
 displaying the contents of the panel dump file in a panel dump browser tool, the panel dump browser tool providing a graphical user interface through which a user can view contents of the panel dump file, the panel dump browser tool comprising an analysis window;
 monitoring user interactions with the panel dump browser tool;
 saving relevant information displayed in the analysis window to a summary report array, the saving being triggered by one of an automatic recording mode and a selective recording mode, the saving using the selective recording mode comprising:
  selecting a recording option on the analysis window and saving the relevant information in the summary report array when the recording option is selected, the relevant information comprising: state information of a memory job in an investigate memory job panel selected by a user when the analysis window is a memory job window; state information of a memory-mapped job in a specific input/output (I/O) panel selected by the user when the analysis window is a memory-mapped job window; interrupt summary in an interrupt summary panel selected by the user when the analysis window is a memory-mapped job window; search result in a search result panel when the analysis window is a search window; and sum file information in a sum file panel selected by the user when the analysis window is a sum file window; and
  displaying the contents of the summary report array in a report window.

2. The method of claim 1 further comprising:
copying the summary report array to a summary report file.

3. The method of claim 1 wherein the computer system is a cellular multiprocessor system.

4. A method comprising:
opening a panel dump file, the panel dump file comprising system state information stored by a system maintenance processor in a multiprocessor system;
displaying the contents of the panel dump file in a panel dump browser tool, the panel dump browser tool providing a graphical user interface through which a user can view contents of the panel dump file, the panel dump browser tool comprising an analysis window;
monitoring user interactions with the panel dump browser tool;
saving relevant information displayed in the analysis window to a summary report array, the saving being triggered by one of an automatic recording mode and a selective recording mode, saving the relevant information using the automatic recording mode comprising:
determining if the relevant information has been saved in the summary report array, the relevant information comprising: current date and time of day, name and path of the panel dump file, a stopped unit, cause of stop, and initial warning when the analysis window is a stop summary window; error summary of a functional unit when the analysis window is an error summary window; an active job summary when the analysis window is an active job summary window, the active job being one of an active subpod job, an active memory job, and an active memory-mapped job; an I/O activity summary when the analysis window is an investigate memory-mapped job window; and
automatically saving the relevant information if the relevant information has not been saved.

5. An article of manufacture comprising:
a machine-accessible medium having data stored thereon that, when accessed by a machine, causes the machine to perform operations comprising:
opening a panel dump file, the panel dump file comprising system state information stored by a system maintenance processor in a multiprocessor system;
displaying the contents of the panel dump file in a panel dump browser tool, the panel dump browser tool providing a graphical user interface through which a user can view contents of the panel dump file, the panel dump browser tool comprising an analysis window;
monitoring user interactions with the panel dump browser tool;
saving relevant information displayed in the analysis window to a summary report array, the saving being triggered by one of an automatic recording mode and a selective recording mode, the saving using the selective recording mode comprising:
selecting a recording option on the analysis window and saving the relevant information in the summary report array when the recording option is selected, the relevant information comprising: state information of a memory job in an investigate memory job panel selected by a user when the analysis window is a memory job window; state information of a memory-mapped job in a specific input/output (I/O) panel selected by the user when the analysis window is a memory-mapped job window; interrupt summary in an interrupt summary panel selected by the user when the analysis window is a memory-mapped job window; search result in a search result panel when the analysis window is a search window; and sum file information in a sum file panel selected by the user when the analysis window is a sum file window; and
displaying the contents of the summary report array in a report window.

6. The article of manufacture of claim 5 wherein the data causing the machine to perform the operations further comprise data that, when accessed by the machine, cause the machine to perform operations comprising:
copying the summary report array to a summary report file.

7. The article of manufacture of claim 5 wherein the computer system is a cellular multiprocessor system.

8. An article of manufacture comprising a machine-accessible medium having data stored thereon that, when accessed by a machine, causes the machine to perform operations comprising:
opening a panel dump file, the panel dump file comprising system state information stored by a system maintenance processor in a multiprocessor system;
displaying the contents of the panel dump file in a panel dump browser tool, the panel dump browser tool providing a graphical user interface through which a user can view contents of the panel dump file, the panel dump browser tool comprising an analysis window;
monitoring user interactions with the panel dump browser tool;
saving relevant information displayed in the analysis window to a summary report array, the saving being triggered by one of an automatic recording mode and a selective recording mode, saving the relevant information using the automatic recording mode comprising:
determining if the relevant information has been saved in the summary report array, the relevant information comprising: current date and time of day, name and path of the panel dump file, a stopped unit, and initial warning when the analysis window is a stop summary window; error summary of a functional unit when the analysis window is an error summary window; an active job summary when the analysis window is an active job summary window, the active job being one of an active subpod job, an active memory job, and an active memory-mapped job; an I/O activity summary when the analysis window is an investigate memory-mapped job window; and
automatically saving the relevant information if the relevant information has not been saved.

\* \* \* \* \*